United States Patent
Yamazaki et al.

(10) Patent No.: US 7,118,154 B2
(45) Date of Patent: Oct. 10, 2006

(54) STRUCTURE FOR SUPPORTING AN INSTRUMENT PANEL BY A DEFROSTER NOZZLE

(75) Inventors: Yasunobu Yamazaki, Okazaki (JP); Brian Johnson, Troy, MI (US)

(73) Assignees: Mitsubishi Jidosha Kogyo Kabushiki Kaisha, Tokyo (JP); Collins & Aikman Corporation, Troy, MI (US)

( * ) Notice: Subject to any disclaimer, the term of this patent is extended or adjusted under 35 U.S.C. 154(b) by 0 days.

(21) Appl. No.: 11/324,254

(22) Filed: Jan. 4, 2006

(65) Prior Publication Data

US 2006/0108824 A1 May 25, 2006

Related U.S. Application Data

(63) Continuation of application No. 10/743,040, filed on Dec. 23, 2003, now abandoned.

(51) Int. Cl.
*B62D 25/14* (2006.01)

(52) U.S. Cl. .......................... 296/70; 454/127

(58) Field of Classification Search ............... 296/70, 296/72; 454/121, 127
See application file for complete search history.

(56) References Cited

U.S. PATENT DOCUMENTS

| | | | |
|---|---|---|---|
| 5,979,965 A | 11/1999 | Nishijima et al. | |
| 6,203,092 B1 | 3/2001 | Yoshinaka | |
| 6,601,902 B1 | 8/2003 | Rahmstorf et al. | |
| 6,685,261 B1 | 2/2004 | Brancheriau et al. | |
| 6,863,340 B1 | 3/2005 | Kawahigashi | |

FOREIGN PATENT DOCUMENTS

JP 8-118942 A 5/1996

*Primary Examiner*—Dennis H. Pedder
(74) *Attorney, Agent, or Firm*—Birch, Stewart, Kolasch & Birch, LLP

(57) ABSTRACT

A structure for supporting an instrument panel by a defroster nozzle so that sufficient rigidity can be imparted to the top of the instrument panel. A supporting member is attached to an upper wall of the defroster nozzle arranged inside the instrument panel and is disposed in contact with the instrument panel to support same.

8 Claims, 2 Drawing Sheets

STRUCTURE FOR SUPPORTING AN INSTRUMENT PANEL BY A DEFROSTER NOZZLE

CROSS-REFERENCE TO RELATED APPLICATION

This application is a Continuation of application Ser. No. 10/743,040, filed on Dec. 23, 2003 now abandoned, and for which priority is claimed under 35 U.S.C. § 120; and this application claims priority of Application No. 2002-375218 filed in Japan on Dec. 25, 2002 under 35 U.S.C. § 119; the entire contents of all are hereby incorporated by reference.

BACKGROUND OF THE INVENTION

1. Field of the Invention

The present invention relates to a supporting structure for an instrument panel of a motor vehicle, and more particularly, to a structure for supporting an instrument panel by a defroster nozzle.

2. Description of the Related Art

An automotive air conditioner provides a comfortable environment for occupants of the vehicle in all climatic and driving conditions, prevents fogging and frosting of the windshield etc. to secure the driver's range of vision, and also permits safe and comfortable driving, and thus most of motor vehicles are equipped with an air conditioner. The air conditioner is usually arranged in the vehicle body at a location under an approximately central portion of the instrument panel, and conditioned air is guided through an air duct arranged inside the instrument panel and let out from vents located in the vehicle compartment. Also, a defroster is provided for eliminating fogging of the windshield and adapted to eject warm air toward the inside of the windshield from thereunder, thus removing fogging of the inside of the windshield.

The air conditioned by the air conditioner flows up toward the vents while pushing the ceiling wall of the air duct upward, and thus the joint between the inlet of the air duct and the air outlet may possibly become separated, causing leakage of the air. To prevent this, an air conditioner air duct has been proposed wherein the air duct arranged inside the instrument panel is provided with a rib, as an abutment, which is disposed in contact with the inside surface of the top of the instrument panel (see Unexamined Japanese Patent Publication No. H08-118942 (hereinafter referred to as Patent Document 1), for example).

The instrument panel is arranged along the overall width of the driver's and front passenger's seats of the vehicle, and a front end portion thereof extends to the bottom of the windshield and is provided with an opening for a defroster nozzle. Usually, the instrument panel is a resin molded article and has a reinforced structure such that the instrument panel is supported at its front portion by a deck cross member through brackets, supported at its rear portion by brackets extended downward from the deck cross member, and supported at its both sides by front pillars. However, the offset of the central portion of the instrument panel from the deck cross member is large, giving rise to a problem that the central portion is liable to be bent or warped because of its low rigidity. Especially in the case of a wide deck type instrument panel having an increased dimension between its front and rear ends, the rigidity of the central portion is noticeably low.

A rib may be formed on the inside surface (underside) of the instrument panel near the central portion thereof so that the central portion may be supported by the air duct etc. of the air conditioner located under the instrument panel. If such a rib is formed on the inside surface of the instrument panel, however, a problem arises in that a sink mark may appear on the outside surface of the instrument panel, impairing the appearance. Also, in the case where there is a considerable distance (large space) between the instrument panel and the air duct etc., the rib needs to be lengthened, which leads to poor moldability. Further, in the case of the structure disclosed in Patent Document 1 wherein the air conditioner air duct is provided with a rib which is disposed in contact with the inside surface of the top of the instrument panel, not only the moldability is poor but a wide area cannot be secured for supporting the instrument panel. With this structure, it is difficult to increase the rigidity of the top of, in particular, a wide deck type instrument panel.

SUMMARY OF THE INVENTION

An object of the present invention is to provide a structure for supporting an instrument panel by a defroster nozzle capable of imparting sufficient rigidity to the top of the instrument panel.

The present invention provides a structure for supporting an instrument panel, comprising: a defroster nozzle arranged inside the instrument panel; and a supporting member disposed on an upper wall of said defroster nozzle and contacts with the instrument panel on the surface one another to support the instrument panel.

Thus, sufficient rigidity can be imparted to the top of the instrument panel, thereby effectively preventing bending or warping of the top of the instrument panel.

DETAILED DESCRIPTION

A preferred embodiment of the present invention will be hereinafter described in detail with reference to the drawings which are given by way of illustration only.

Figure 1:
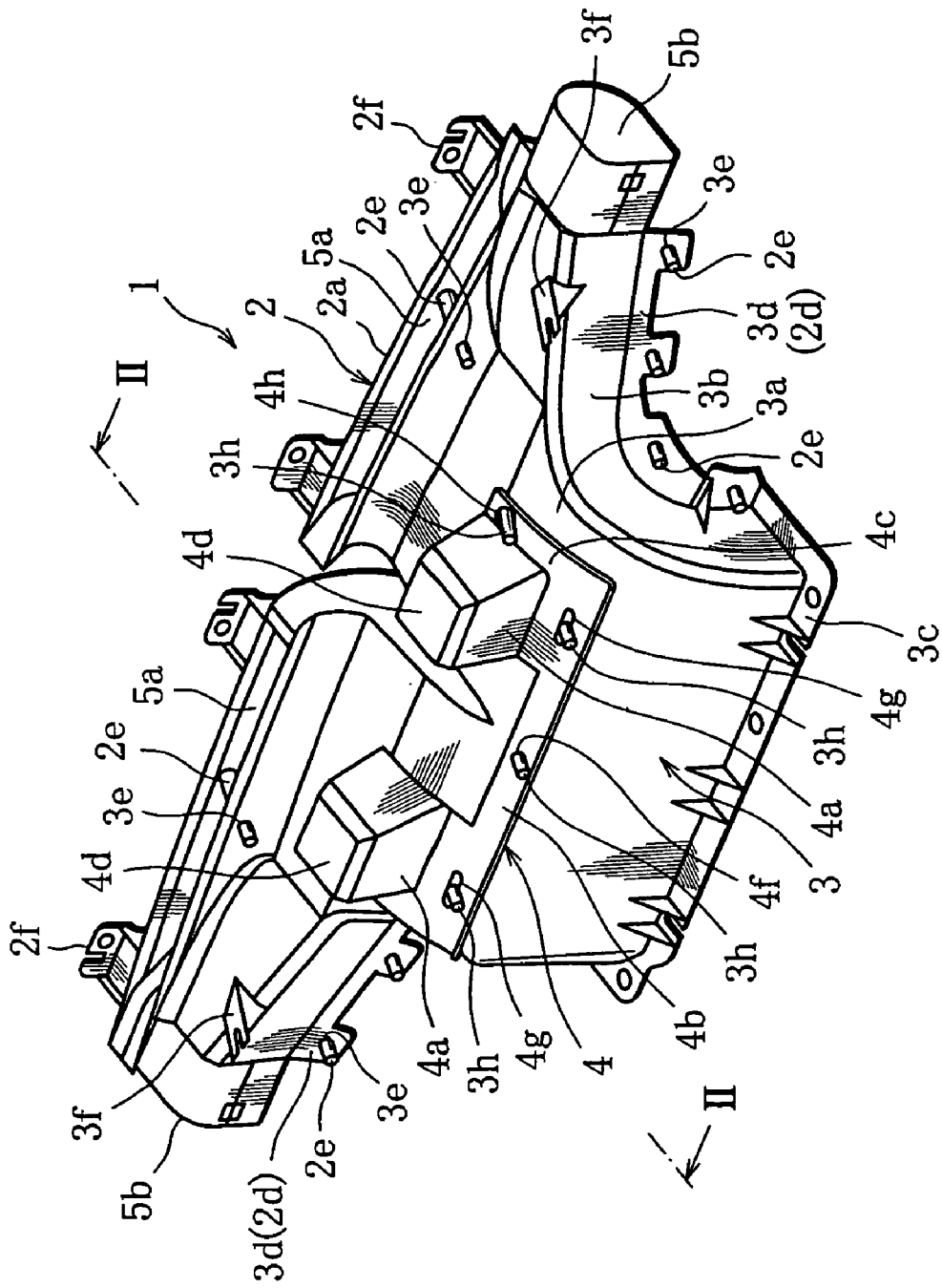
FIG. 1 is a perspective view showing an assembled state of a defroster nozzle used in an instrument panel supporting structure according to the present invention.
Figure 2:
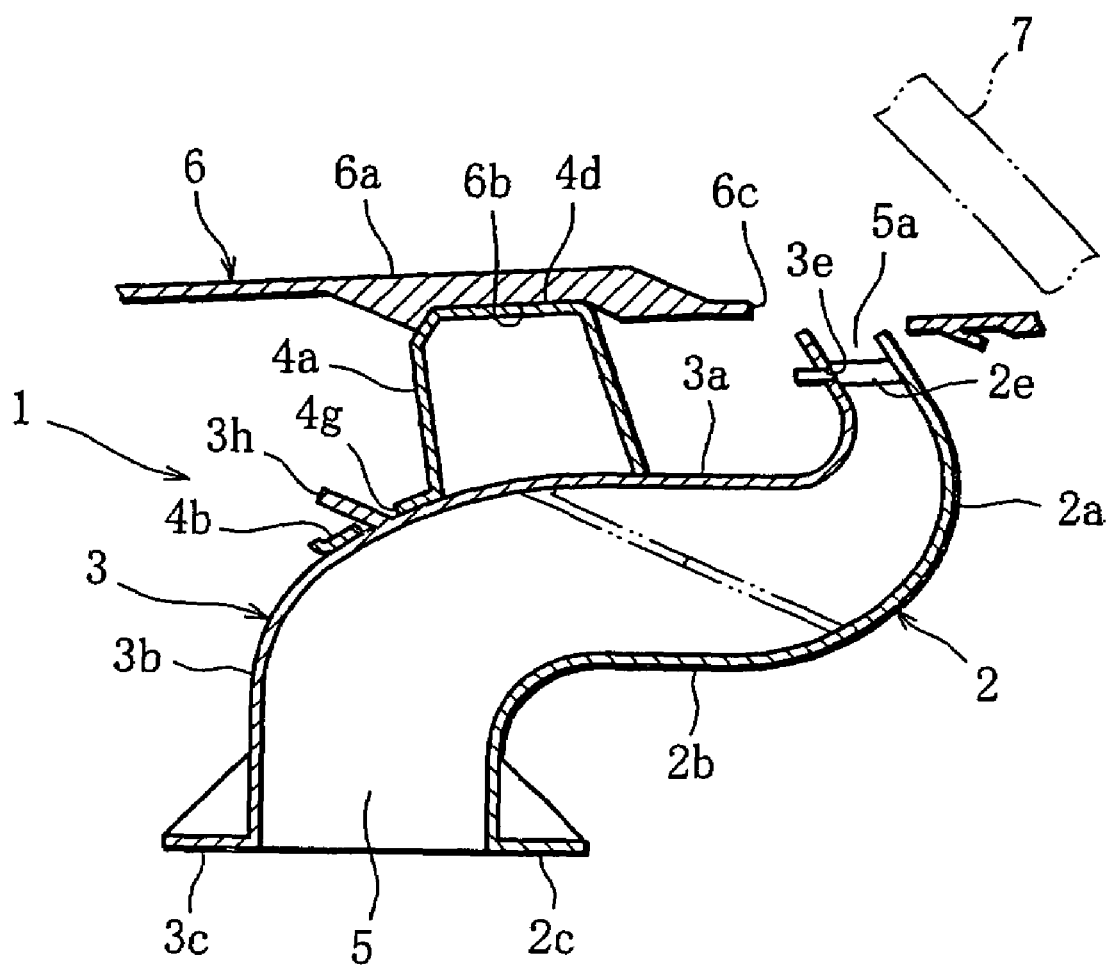
FIG. 2 is a sectional view taken along line II—II in FIG. 1.

FIG. 1 is a perspective view of a defroster nozzle used in an instrument panel supporting structure according to the present invention, and FIG. 2 is a sectional view taken along line II—II in FIG. 1. As shown in FIGS. 1 and 2, the defroster nozzle 1 comprises three members, that is, a defroster nozzle front member 2, a defroster nozzle rear member 3, and a defroster nozzle supporting member 4 as a member for reinforcing an instrument panel 6. The defroster nozzle front member 2 has a front wall 2a located on one side of the defroster nozzle 1 closer to the front of a vehicle body, and a lower wall 2b continuous with the front wall. The defroster nozzle rear member 3 has an upper wall 3a and right and left side walls 3b, 3b continuous with the upper wall. The front and rear members are combined to form an air duct.

Specifically, the air duct 5 (FIG. 2) is defined by the front wall 2a and lower wall 2b of the defroster nozzle front member 2 and the upper wall 3a and both side walls 3b of the defroster nozzle rear member 3. The air duct 5 branches off into front defroster nozzles 5a, 5a opening upward and side defroster nozzles 5b, 5b opening sideways on the right and left sides, respectively. The lower wall 2b of the defroster nozzle front member 2 and the upper wall 3a and side walls 3b of the defroster nozzle rear member 3 have flanges 2c and 3c protruding from their respective lower edges to be connected to an air duct of an air conditioner.

The defroster nozzle front member 2 also has flanges 2d, as joint faces, protruding from peripheral edges of the lower wall 2b thereof, and assembling bosses 2e are formed on the flanges 2d. Assembling bosses 2e are also formed on an inside surface of the upper portion of the front wall 2a so as to be oriented in the same direction. A plurality of, for example, four mounting portions 2f for mounting the defroster nozzle 1 to the vehicle body protrude integrally from the front wall 2a of the defroster nozzle front member 2.

The defroster nozzle rear member 3 has flanges 3d protruding from peripheral edges of lower portions of the side walls 3b thereof, as joint faces corresponding to the flanges 2d of the defroster nozzle front member 2, and mounting holes 3e for receiving the respective assembling bosses 2e are formed in the flanges 3d. A front end portion of the upper wall 3a is curved upward and has mounting holes 3e formed therein for receiving distal ends of the respective assembling bosses 2e. Also, mounting portions 3f for mounting the defroster nozzle 1 to the vehicle body protrude integrally from both sides of the upper wall 3a. The assembling bosses and mounting holes for joining the defroster nozzle front and rear members 2 and 3 together may be formed such that either of the flanges 2d and 3d are provided with the assembling bosses and the other with the mounting holes. In the case where the assembling bosses 2e are formed on the flanges 2d of the defroster nozzle front member 2, the assembly of the defroster nozzle supporting member 4 is facilitated, as described later.

The defroster nozzle supporting member 4 has a pair of supports 4a each having a substantially rectangular external form. Each support 4a is in the form of a box opening downward and having an upper surface (bottom) 4d. Specifically, as shown in FIG. 1, the defroster nozzle 1 is bifurcated right and left along the width direction of the vehicle, and the supports 4a are arranged on the bifurcated right and left portions of the defroster nozzle 1, respectively, with a space therebetween. The supports 4a are connected to each other by a connecting part 4b continuous with lower edges of the respective rear walls.

Right and left sides of the connecting part 4b are continuous with lower edges of outer side walls of the right and left supports 4a, respectively, thus forming flanges 4c. The defroster nozzle supporting member 4 is placed on a central portion of the upper wall 3a of the defroster nozzle rear member 3. Specifically, the connecting part 4b and the flanges 4c are shaped so as to match the shape of the upper wall 3a, and the supports 4a are supported at their lower ends by the upper wall 3a in contact therewith.

The height of the supports 4a from the upper wall 3a of the defroster nozzle rear member 3 to their upper surfaces 4d is set to a height which is necessary for the supports 4a to come into contact with and support the inside surface of a central portion 6a of the instrument panel 6. Because of the box-like shape, the supports 4a have increased rigidity and permit the areas of the upper surfaces 4d to be enlarged, thus making it possible to contact with inside surface of the central portion 6a of the instrument panel 6. The supports upper surfaces contact the instrument panel 6. Further, the box-like shape permits the supports 4a to be increased in height while ensuring sufficient rigidity, and accordingly, the defroster nozzle can be easily applied to vehicles having a long distance (large space) between the defroster nozzle and the instrument panel 6. The defroster nozzle supporting member 4 is molded separately from the defroster nozzle rear member 3, and it is therefore possible to prevent the formation of a sink mark, which appears on the surface of the defroster nozzle rear member 3 when the two members are molded as a one-piece member.

The connecting part 4b and the flanges 4c have mounting holes 4f, 4g and 4h formed therein. The central mounting hole 4f is a circular hole which also serves as positioning means for restraining the supporting member from being displaced to the front or the rear or to sides. The mounting holes 4g located on both sides of the central hole are each an elongate hole elongated sideways, and the mounting holes 4h in the flanges 4c are circular holes slightly larger than the mounting hole 4f. Support-mounting bosses 3h are formed on the upper wall 3a of the defroster nozzle rear member 3 at locations corresponding to the mounting holes 4f, 4g and 4h, respectively, and are oriented in a direction identical with that of the assembling bosses 2e. The mounting hole 4f can receive the corresponding support-mounting boss 3h, and the mounting holes 4g can receive the corresponding support-mounting bosses 3h even if the bosses are slightly displaced to sides. The mounting holes 4h can receive the corresponding support-mounting bosses 3h even if the bosses are slightly displaced to the front or the rear or to sides. In this manner, displacement of the support-mounting bosses 3h relative to the respective mounting holes 4f to 4h of the defroster nozzle supporting member 4 can be absorbed, whereby the assembly of the defroster nozzle supporting member 4 is facilitated. Also, the mounting hole 4f, which also serves as positioning means, permits the supporting member 4 to be accurately positioned and mounted to the upper wall 3a of the defroster nozzle rear member 3.

The defroster nozzle front member 2, the defroster nozzle rear member 3 and the defroster nozzle supporting member 4 are formed at the same time by molding resin in a single mold (3-cavity type). Such simultaneous formation by means of a single mold makes it possible to reduce mold costs. Also, since the defroster nozzle supporting member 4 is formed as a separate member, the shape thereof can be changed as desired and the freedom of layout widens.

The flanges 2d and 3d of the defroster nozzle front and rear members 2 and 3, which constitute the joint faces, are brought into contact with each other, with the assembling bosses 2e inserted into the respective mounting holes 3e. Also, the defroster nozzle supporting member 4 is placed on the upper wall 3a of the defroster nozzle rear member 3, with the support-mounting bosses 3h inserted into the respective mounting holes 4f to 4h. Then, the distal ends of the assembling bosses 2e and support-mounting bosses 3h are heated and melted at the same time, to weld the bosses to the peripheral edges of the respective mounting holes 3e and 4f to 4h. In this manner, the defroster nozzle 1 is fabricated.

The assembling bosses 2e formed on the flanges 2d of the defroster nozzle front member 2 are oriented in the same direction as the support-mounting bosses 3h formed on the upper wall 3a of the defroster nozzle rear member 3. Accordingly, the defroster nozzle front and rear members 2 and 3 and the defroster nozzle supporting member 4 can be assembled with ease. Also, a welding machine used for joining the members may have a simple construction, and the welding requires only a simple operation, thus enhancing the work efficiency. Further, since the defroster nozzle supporting member 4 and the defroster nozzle front and rear members 2 and 3 are molded at the same time and also are welded together at the same time, man-hour can be cut down and the manufacturing and tooling costs can be minimized.

The defroster nozzle 1 is arranged inside the instrument panel 6, as shown in FIG. 2. At this time, the inlet of the air duct 5 is connected to an air outlet of the air conditioner. Also, the defroster nozzle 1 is positioned such that the front defroster nozzles 5*a*, 5*a* each open into an opening 6*c* of the instrument panel 6 and are situated inside a windshield 7 close to the bottom thereof, and that the side defroster nozzles 5*b*, 5*b* are directed toward the windows of respective front doors (not shown).

The instrument panel 6 is a wide type, for example, and is supported at its front portion by deck brackets, supported at its rear portion by brackets connected to the deck brackets, and supported at its both sides by front pillars (none of the brackets and pillars are shown). Recesses 6*b* are formed in the inside surface of the central portion 6*a* at locations corresponding to the upper surfaces 4*d* of the respective supports 4*a* of the defroster nozzle supporting member 4. The upper surfaces 4*d* of the supports 4*a* of the defroster nozzle supporting member 4 abut against the respective recesses 6*b* and support the central portion 6*a* from below. The supports 4*a* are box-shaped and thus have increased rigidity and also the upper surfaces 4*d* have a large area, as mentioned above. Accordingly, the inside surface 6*b* of the central portion of the instrument panel 6 can be securely supported on the surface with a large contact area. This structure imparts sufficient rigidity to the central portion of the top of the wide type instrument panel 6 and thus can effectively prevent the top of the instrument panel from being bent or warped.

In the foregoing embodiment, the defroster nozzle supporting member 4 is provided with a pair of supports 4*a*. The number of supports 4*a* is, however, not limited to two, and a single or three or more supports 4*a* may be provided instead.

What is claimed is:

1. A structure for supporting an instrument panel, comprising:
    a defroster nozzle arranged inside the instrument panel; and
    a supporting member disposed on an upper wall of said defroster nozzle that contacts a surface of the instrument panel; wherein said supporting member includes at least one support having a substantially rectangular external form and formed separately from said defroster nozzle.

2. The structure according to claim 1, wherein said support is shaped like a box opening downward and having a bottom at an upper end thereof, the bottom being disposed in contact with the instrument panel on the surface.

3. The structure according to claim 1, wherein said defroster nozzle is bifurcated right and left along a width direction of a motor vehicle, and
    said support is arranged on each of the bifurcated right and left portions of said defroster nozzle.

4. The structure according to claim 2, wherein said supporting member has a plurality of mounting holes, the upper wall of said defroster nozzle has support-mounting bosses respectively inserted into the mounting holes, and
    said supporting member is joined to said defroster nozzle by heating and melting the support-mounting bosses.

5. The structure according to claim 4, wherein said defroster nozzle includes a defroster nozzle front member having a front wall and a lower wall continuous with the front wall, and a defroster nozzle rear member having an upper wall and side walls continuous with the upper wall, the defroster nozzle front member and the defroster nozzle rear member being assembled to form an air duct,
    the defroster nozzle front member and the defroster nozzle rear member have flanges protruding from peripheral edges thereof, respectively, and constituting joint faces, the flanges of one of the defroster nozzle front and rear members have a plurality of assembling bosses formed thereon, the flanges of the other of the defroster nozzle front and rear members have a plurality of mounting holes formed therein for receiving the respective assembling bosses, and
    the defroster nozzle front and rear members are joined together by heating and melting the assembling bosses at the same time that the support-mounting bosses are heated and melted.

6. The structure according to claim 4, wherein at least one of said plurality of mounting holes of said supporting member serves also as positioning means.

7. The structure according to claim 5, wherein said defroster nozzle front member, said defroster nozzle rear member and said supporting member are formed simultaneously by means of a single mold.

8. The structure according to claim 5, wherein the assembling bosses formed on the flanges of said defroster nozzle front or rear member are oriented in a direction identical with that of the support-mounting bosses formed on the upper wall of said defroster nozzle.

* * * * *

UNITED STATES PATENT AND TRADEMARK OFFICE
CERTIFICATE OF CORRECTION

| | |
|---|---|
| PATENT NO. | : 7,118,154 B2 |
| APPLICATION NO. | : 11/324254 |
| DATED | : October 10, 2006 |
| INVENTOR(S) | : Yasunobu Yamazaki et al. |

It is certified that error appears in the above-identified patent and that said Letters Patent is hereby corrected as shown below:

TITLE PAGE:

Please add:

Item (30) as to the Forigen Application Priority Data should read -- JAPAN 2002-375218 December 25, 2002 --

Signed and Sealed this

Sixteenth Day of January, 2007

JON W. DUDAS
*Director of the United States Patent and Trademark Office*